Dec. 11, 1928.
H. E. RIDER
THERMOSTAT
Filed June 11, 1925
1,694,928
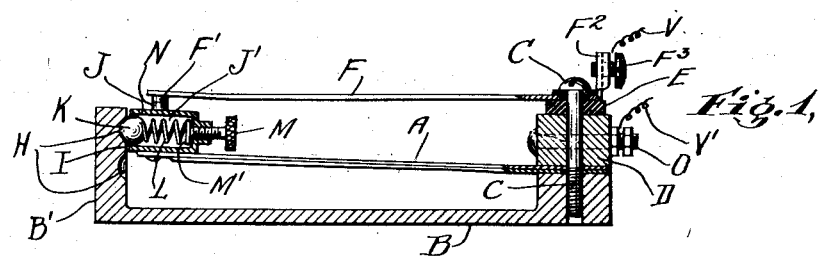
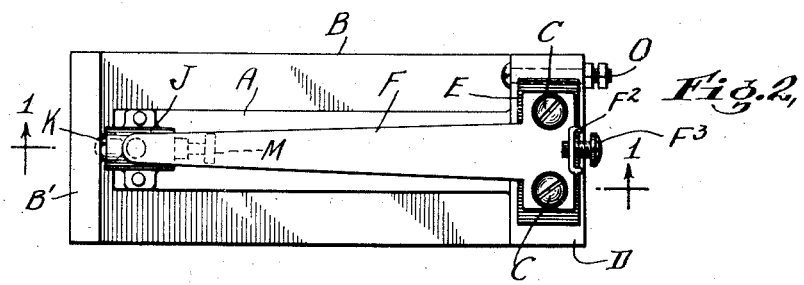
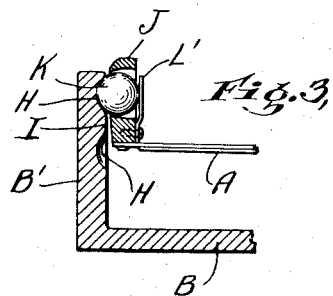
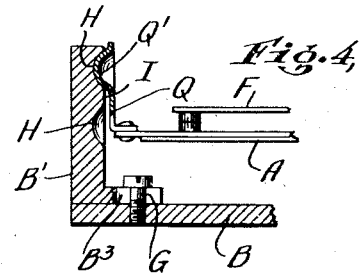
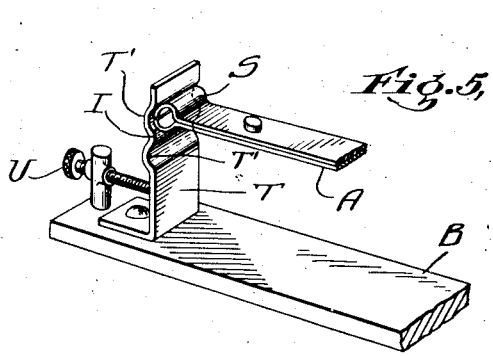
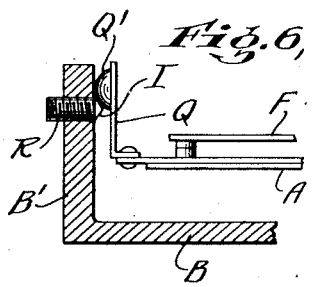
INVENTOR
HERBERT E. RIDER
ATTORNEY

Patented Dec. 11, 1928.

1,694,928

UNITED STATES PATENT OFFICE.

HERBERT E. RIDER, OF LYNBROOK, NEW YORK, ASSIGNOR TO BEAVER MACHINE & TOOL CO. INC., OF NEWARK, NEW JERSEY.

THERMOSTAT.

Application filed June 11, 1925. Serial No. 36,296.

My invention relates to thermostats.

The principal object of my invention is to provide an improved thermostat, the action of which may be mechanically controlled.

A further object is to provide a combined thermostat and electrical switch of simple and durable construction, so combined that the contact points of the switch will be separated beyond the arcing distance by a quick movement, and will return to its normal position by a quick movement to prevent arcing.

A further object is to provide a combined thermostat and electrical switch of simple and durable construction, so combined that the contact points of the switch and the thermostat will be held in a rigid position until the thermostat element has flexed a predetermined degree by expansion and contraction due to heating and cooling thereof, at which time it is suddenly released and moves quickly from its restrained position in a manner whereby the contact points of the switch will be alternately united and separated beyond the arcing point by a quick movement of the thermostat end.

Another object is to provide a thermostat element having a rotatable ball, cylindrical or spherical shaped end affixed to its movable end adapted to engage sockets or depressions in a wall adjacent to its end and which will pass smoothly and quickly from one socket or depression to the other over an abutment and seat the end and hold the thermostat in a rigid position until spring tension between the thermostat end and adjacent wall has been overcome by expansion and contraction of the thermostat element, due to heating and cooling which causes the thermostat end to jump quickly from one socket or depression to the other.

Referring to the drawings which form a part of this specification,

Fig. 1 is a vertical sectional view taken on the dotted lines of Figure 2 and in the direction indicated by the arrows.

Fig. 2 is a plan view of the construction shown in Figure 1.

Fig. 3 is a vertical sectional view illustrating a modified construction in which a flat leaf spring is used in place of a helical spring.

Fig. 4 is a similar view illustrating another modification of the invention.

Fig. 5 is a perspective view of still another modification, illustrating a simple form of construction in which the adjustable spring and abutment are formed integral.

Fig. 6 illustrates a further detail which may be used if desired.

Many further modifications may easily be made without departing from the invention herein disclosed.

In making my improved device I employ the well known means for actuating the switch comprising two strips of metal having different co-efficients of expansion, such as brass and zinc welded together in superimposed relation, which when acted upon by heat, will bend and cause the free end to move in the arc of a circle, as will be readily understood.

A, indicates the above described construction which is here shown fastened at one end to a base plate B of fire proof material such as porcelain, by screws C—C respectively, which also serve to clamp the block D, insulating material E, and spring metal arm F, together in fixed relation, as clearly illustrated in Figures 1 and 2. Supported on the base plate B is an upwardly extending wall portion B' formed integral therewith as illustrated in Figures 1, 2, 3 and 6, or may be connected thereto in adjustable relation therewith as illustrated in Figure 4, in which construction a screw G extends through a slot $B^3$ formed in the lower offset end portion of the wall B' to secure the wall to the base.

The wall portion B' is provided with depressions H—H respectively located in vertical alignment and spaced a short distance apart to provide an abutment I, between them. Rigidly mounted on the free end of the arm A in Figures 1 and 2 is a metal cage J, having a cylindrical bore J' which carries a ball K which is adapted to fit into said depressions H. A helical spring L is carried in said bore J', the tension of which may be changed by a screw M which extends through the end wall of the cage J and carries a disc M' on its inner end which abuts one end of said spring 2 and forces the opposite end of said spring against said ball K.

A contact point N is carried on the top of said cage J which is adapted to contact with a similar contact point F' carried on the under side of the arm F at its free end. A portion of the arm F indicated by $F^2$ is bent upwardly and provided with a screw $F^3$ to secure an electrical conductor to said arm F. A short bolt extends through the block D, and is provided with a binding post O. In Figure 3 a leaf spring L' is used in place of the helical spring shown in Figure 1. In Figures 4 and 6 a leaf spring Q is riveted to the end of the element A and its upper end is formed with a ball shaped face Q' which co-acts with the depressions H shown in Figure 4 in practically the same manner as the ball K co-acts with the depressions in Figures 1 and 2. In Figure 6 I have shown a screw R which extends through the wall B' and forms an abutment I to serve the same function as that served by the abutment shown in Figures 1 and 2.

In this case the abutment is adjustable in the wall instead of the wall being adjustable relative to the element H as shown in Figure 4.

In Figure 5 the free end of the element A is formed to provide a cylindrical or curved surface S, and a flexible spring metal strip T is provided with depressions T'—T' respectively with an abutment I formed between them, and the strip T may be bent by the screw U to secure proper adjustment.

V—V' respectively indicate the positive and negative sides of an electrical circuit which is automatically broken by means of the thermostat A when sufficient heat is applied thereto to cause the thermostat to bend and carry the free end thereof downward a pre-determined distance where it is held in locked relaton with the element B' by means of the abutment I, until the thermostat again is cooled to a pre-determined temperature, when it again snaps back into upper depression H.

The device is shown in its normal position with the electric circuit closed, and as the thermostat is heated to its point of action the thermostat A gradually bends into the arc of a circle and the free end suddenly snaps downward over the abutment or barrier I, and the ball K or curved end Q or S, as the case may be, enters the lower depression H of the wall and is held thereby until the thermostat cools, when it again snaps back over the barrier into the normal position. The thermostat may be adjusted to act at a required temperature by means of the screw M in Figures 1 and 2, or by the adjustment of the wall B' to or from the thermostat as illustrated in Figures 4 and 5, or by moving the abutment as illustrated in Figure 6.

Electricity flows through the terminal F², arm F, contacts F' and N, casing J and thermostat A through the block D to binding post O. In the act of breaking the circuit by separating the contact points F' and N, the spring arm F carries the contact F' downward in contact with the contact N until the face of the ball or spring pressed element snaps over the barrier I at which instant the said contacts are separated suddenly to a distance greater than the arcing distance, to prevent burning the contact faces due to arcing.

Having thus described my invention I claim as new:

1. A thermostat control device comprising a base portion, a thermostat element connected rigidly to said base portion at one end and extending across the same, and means comprising a wall having an abutment located adjacent the movable end of said thermostat element adapted to contact therewith and retard the movement thereof until the thermostat element has flexed a predetermined degree due to heating thereof at which time it is suddenly released and moves quickly from its normal position to a predetermined position of rest, an electrical contact point carried by the thermostat element, a spring arm rigidly connected to one end of said base portion the free end of which has a contact point adapted to contact the point carried by the thermostat element to close an electric circuit when in contact therewith.

2. A thermostat control device comprising a base portion, a thermostat element connected rigidly to said base portion at one end and extending across the same, and means comprising a wall having an abutment located adjacent the movable end of said thermostat element adapted to contact therewith and retard the movement thereof until the thermostat element has flexed a predetermined degree due to heating thereof at which time it is suddenly released and moves quickly from its normal position to a predetermined position of rest, an electrical contact point carried by the thermostat element, a spring arm rigidly connected to one end of said base portion the free end of which has a contact point adapted to contact the point carried by the thermostat element to close an electric circuit when in contact therewith, and a screw which holds said elements in mechanical relation.

3. A thermostat control device comprising a base portion, a thermostat element connected rigidly to said base portion at one end and extending across the same, and means comprising a wall having an abutment located adjacent the movable end of said thermostat element adapted to contact therewith and retard the movement thereof until the thermostat element has flexed a predetermined degree due to heating thereof at which time it is suddenly released and moves quickly from its normal position to a predetermined position of rest, an electrical contact point carried by the thermostat element, an arm rigidly connected to one end of said base portion the free end of which has a contact point adapted to contact the point carried by the thermostat element to close an electric circuit when in contact therewith, and means for holding said arm and thermostat elements in detachable mechanical and electrical relation.

4. A thermostat control device comprising a base portion, a thermostat element connected rigidly to said base portion at one end and extending across the same and means located adjacent the movable end of said thermostat element adapted to contact therewith and retard the movement thereof, and means carried by said thermostat element for adjusting the degree of pressure between said thermostat element and said retarding means.

5. A thermostat control device comprising a base portion, a thermostat element connected rigidly to the said base portion at one end and extending across the same, and means comprising a wall having depressions spaced a predetermined distance from each other to form an abutment, and located adjacent the movable end of said thermostat element to seat and retard the movement thereof until the thermostat element has flexed a predetermined degree by alternate heating and cooling thereof, at which time it is suddenly released and moves quickly over said abutment from one depression to the other and seats the end of the thermostat element.

6. A thermostat control device comprising a base portion, a thermostat element connected rigidly to the said base portion at one end and extending across the same, and means comprising a wall having depressions spaced a predetermined distance from each other to form an abutment, and located adjacent the movable end of said thermostat element to seat and retard the movement thereof until the thermostat element has flexed a predetermined degree by alternate heating and cooling thereof, at which time it is suddenly released and moves quickly over said abutment from one depression to the other and seats the end of the thermostat element, and means for adjusting the degree of pressure between said thermostat and wall.

7. A thermostat having a movable end, a casing affixed to the said end adapted to hold a ball in a manner whereby it may rotate and slide partially within the said casing, an adjustable spring engaging one end of the ball, a wall adjacent to the movable end of the thermostat having an abutment and sockets on either side thereof in the said wall adapted to seat the said ball and retard the movement of the thermostat until a predetermined degree of the flexing of the thermostat overcomes spring tension exerted against the ball and it jumps quickly from one socket to the other due to expansion or contraction of the thermostat and causes a sudden and lengthy movement of the thermostat end.

8. A thermostat having a movable end, a casing affixed to the said end adapted to hold a ball in a manner whereby it may rotate and slide partially within the said casing, an adjustable spring engaging one end of the ball, a wall adjacent to the movable end of the thermostat having an abutment and sockets on either side thereof in the said wall adapted to seat the said ball and retard the movement of the thermostat until a predetermined degree of the flexing of the thermostat by expansion and contraction due to changes of temperature, overcomes spring tension exerted against the ball and it jumps quickly from one socket to the other due to expansion or contraction of the thermostat and causes a sudden and lengthy movement of the thermostat end.

9. A thermostat of the character described comprising a base member, a thermostat member connected thereto at one end, a contact point carried by said thermostat member, an abutment, a spring-arm having a contact point thereon and serving as an electrical conductor, means for holding the movable end of the thermostat member in a predetermined position while the circuit is closed, means for holding it in a predetermined position while the circuit is broken, the function of the operation being such that the circuit is broken while the thermostat and spring-arm are both moving.

In testimony whereof, I, HERBERT E. RIDER, have signed my name to this specification this twenty-fifth day of May, 1925.

HERBERT E. RIDER.